Dec. 7, 1948.   T. E. SIPPEL   2,455,387
THERMOSTAT-CONTROLLED HEATER CIRCUIT
Filed Oct. 2, 1946
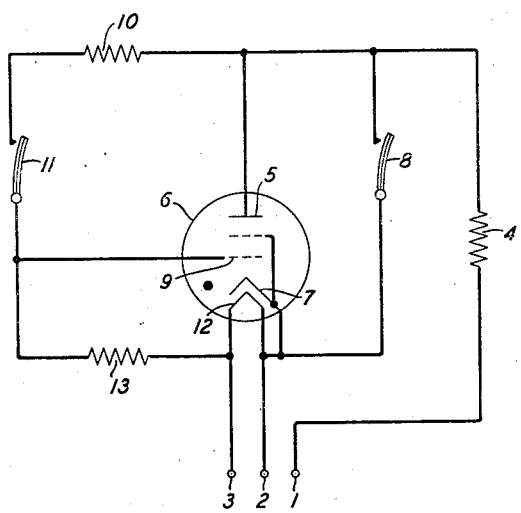
INVENTOR
T. E. SIPPEL
BY
ATTORNEY Patented Dec. 7, 1948

2,455,387

UNITED STATES PATENT OFFICE 2,455,387

THERMOSTAT-CONTROLLED HEATER CIRCUIT

Theodore E. Sippel, Valley Stream, N. Y., assignor to Bell Telephone Laboratories, Incorporated, New York, N. Y., a corporation of New York Application October 2, 1946, Serial No. 700,704

5 Claims. (Cl. 219—20)

This invention relates to temperature control systems. In the operation of thermostat-controlled heating elements, it is desirable to heat the heating element rapidly to bring it up to a critical temperature and then to control the heating element at a predetermined temperature at a reduced rate of heating.

The power used in heating a resistance is proportional to the square of the voltage applied or to the square of the current flowing. In a purely alternating current circuit the power used in heating a resistance is proportional to the square of the effective voltage applied or to the square of the effective current flowing while in a pulsating direct current the power supplied to the load is equal to the square of the average rectified current passing through it. Thus, it can readily be seen that where a heating element is supplied by alternating current energy the rate of heating will be much more rapid than where the same heating element is being supplied by pulsating direct current of the same voltage.

Various attempts have been made to regulate the temperature of a heating element by thermostat-controlled vacuum and gaseous tubes.

Besides its general use as a source of controlled rectified power, the grid-controlled gaseous rectifier serves to supply pulsating direct current. The presence of a grid between the cathode and anode of a gaseous rectifier permits control of the initiation of the arc. When the anode is supplied from a source of alternating current potential the arc is extinguished once each alternate half cycle. When the anode is at a positive potential during the positive half cycle, the rectifier transmits positive pulses. During the negative half cycle the anode potential is negative and no current flows. The rectified current accordingly consists of a series of intermittent pulses of positive polarity which comprise a pulsating direct current. This constitutes what is commonly referred to as "half wave rectification." The average rectified current can be varied over wide limits by controlling the point in each half cycle at which the arc initiation occurs.

The object of this invention is to permit rapid initial heating until a critical temperature is reached, after which the heating energy being supplied to the heating element may be substantially reduced.

A feature of the invention is a supply circuit for an electric heating element arranged for control by a primary thermostat to permit rapid initial heating by alternating current. When a critical temperature is reached a second thermostat controls the flow of pulsating direct current through an electron gas discharge device to supply heating current at a reduced rate to the heating element. The latter thermostat is responsive to variations in temperature at the point about which control is desired.

In accordance with this invention, a heating element may be supplied with current by way of the plate circuit of a gas-filled discharge device and is arranged to permit initial rapid heating by alternating current through a thermostatically-controlled path in shunt of the gas tube. A second thermostat is employed in the grid circuit of the electron gas discharge device which supplies pulsating direct current to the heater element, this thermostat being responsive to the temperature variations of the heating element at a point about which control is desired.

The thermostats are arranged to operate in sequence, the first thermostat being responsive to a selected temperature lower than that at which the second thermostat is operative. With both thermostats closed, the first thermostat provides a path for alternating current through the heater to permit "fast" heating. When this thermostat opens, the tube fires on positive pulses and pulsating direct current is supplied to the heater for "slow" heating. When the second thermostat opens the tube is rendered nonconducting, both thermostats now being in an open position. In this manner, the second thermostat which opens and closes in response to variations in temperature of the heating element controls the input to the tube which supplies the flow of pulsating direct current through the heating element to closely regulate the temperature of the heating element.

An important advantage results from the lengthened thermostat contact life which may be anticipated, due to the fact that while the first thermostat carries the entire heating current, it operates only once each time the device is turned on, the second thermostat, on the other hand, cycles continuously and perhaps rapidly during operation, but it is only called upon to switch the negligible grid biasing current.

This invention will be better understood by reference to the following specification and accompanying drawing wherein the invention is disclosed diagrammatically.

Plate voltage is supplied from the taps 1, 2 through the heating element 4 to the plate 5 of an electron gas discharge device 6. The indirectly heated cathode 7 is heated by filament 12 supplied with alternating voltage from taps 2, 3. A thermostat 8 is connected to the heating element 4 and in its normal condition is so connected as to shunt the electron gas discharge device 6. Connected in the grid circuit of the tube between the plate 5 and the control grid 9 are a currnt limiting resistor 10 and a second thermostat 11 which controls the temperature of the heating element 4 at a higher temperature level than the first thermostat 8. Grid bias is supplied by the drop across the tube heater element 12. The connections are so poled that with thermostat 11 open, the grid is negative when a positive half wave is applied to plate 5. Resistor 13 serves as a current limiting resistor in the grid circuit.

Assuming that both thermostats 8 and 11 are closed at ambient temperature, the heating element 4 is rapidly heated by alternating current through the shunt path provided by thermostat 8. When heating element 4 reaches a critical temperature thermostat 8 opens and an alternating potential is supplied to the plate 5. At the time that a positive half wave is applied to plate 5, current flows in a path extending through resistor 10, thermostat 11, resistor 13, heater 12 and thence to terminal 2. The positive voltage appearing on grid 9 is due to the drop in resistor 13 and heater 12. With the grid positive, current flows through tube 6. The succeeding negative pulse extinguishes the current. In this way pulsating direct current is supplied to the heating element 4. The heating energy supplied to heating element 4 is at a reduced rate compared to that supplied by alternating current. When the heating element reaches a desired temperature, thermostat 11 opens. The control of the temperature of the heating element is then maintained by the action of the gas tube 6. As the current required to provide suitable bias for grid 9 is very small, it is obvious that the contacts of thermostat 11 are required to break only this small current, and due to the reduction in arcing and pitting, an exceptionally long life for these contacts may be anticipated.

What is claimed is:

1. Temperature control apparatus comprising in combination a heating element, temperature responsive means to supply energy to said heating element at a rapid rate until a critical temperature is reached, and means responsive to a further increase in temperature of said heating element to supply pulsating direct current to the heating element whereby energy is supplied to the heating element at a decreased rate.

2. A device for controlling temperature comprising a heating element, a grid-controlled rectifier, a thermostat, means to supply pulsating current to said heating element through said rectifier under the control of said thermostat and an auxiliary thermostat initially operative to supply alternating current to said heating element in order to bring said heating element quickly into the range of control of said first thermostat.

3. A device for controlling temperature comprising a heating element, an electron gas discharge device having an anode, control grid, and cathode, a thermostat connected between the anode and control grid, means to supply pulsating current to said heating element through said gas discharge device under control of said thermostat, and an auxiliary thermostat in shunt with said discharge device initially operative to supply alternating current to said heating element in order to bring said heating element quickly into the range of control of said first thermostat.

4. A device for controlling temperature comprising a heating element, an electron gas discharge device having an anode, control grid, and cathode, a thermostat connected between the anode and control grid, means to supply pulsating current to said heating element through said gas discharge device under control of said thermostat, an auxiliary thermostat in shunt with said discharge device initially operative to supply alternating current to said heating element in order to bring said heating element quickly into the range of control of said first thermostat, and means to render the tube non-conducting with both thermostats open and conducting when said first thermostat is closed and said auxiliary thermostat is open.

5. A device for controlling temperature comprising a heating element, an electron gas discharge device having an anode, control grid and cathode, a control circuit including a thermostat connected between said control grid and said anode, and a biasing resistance connected between said control grid and said cathode, means for supplying pulsating current to said heating element through said gas discharge device when said thermostat is closed, and an auxiliary thermostat in shunt with said discharge device initially operative to supply alternating current to said heating element in order to bring said heating element quickly into the range of control of said first thermostat.

THEODORE E. SIPPEL.

REFERENCES CITED

The following references are of record in the file of this patent:

UNITED STATES PATENTS

| Number | Name | Date |
| --- | --- | --- |
| 2,260,840 | Rowe | Oct. 28, 1941 |
| 2,399,423 | Bletz | Apr. 30, 1946 |